(12) United States Patent
Hunt et al.

(10) Patent No.: US 10,084,885 B2
(45) Date of Patent: *Sep. 25, 2018

(54) SYSTEMS AND METHODS FOR SUBSTITUTING REFERENCES TO CONTENT

(71) Applicant: Facebook, Inc., Menlo Park, CA (US)

(72) Inventors: Peter Hunt, San Francisco, CA (US); Justin Shaffer, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,046

(22) Filed: May 3, 2017

(65) Prior Publication Data

US 2017/0237827 A1 Aug. 17, 2017

Related U.S. Application Data

(63) Continuation of application No. 15/289,678, filed on Oct. 10, 2016, now Pat. No. 9,674,304, which is a continuation of application No. 13/677,059, filed on Nov. 14, 2012, now Pat. No. 9,503,509.

(51) Int. Cl.
| | |
|---|---|
| *H04L 29/08* | (2006.01) |
| *H04L 12/58* | (2006.01) |
| *H04N 21/00* | (2011.01) |

(52) U.S. Cl.
CPC .......... *H04L 67/327* (2013.01); *H04L 51/063* (2013.01); *H04L 51/10* (2013.01); *H04L 51/32* (2013.01); *H04L 67/10* (2013.01); *H04L 67/146* (2013.01); *H04L 67/18* (2013.01);
(Continued)

(58) Field of Classification Search
CPC .......... H04N 21/2396; H04N 21/6581; H04N 21/2743; H04N 21/4788; H04N 21/2541; H04L 51/10; H04L 67/2814; H04L 67/2804; H04L 51/063; H04L 67/146;
(Continued)

(56) References Cited

U.S. PATENT DOCUMENTS

| | | | |
|---|---|---|---|
| 2003/0110234 A1* | 6/2003 | Egli | ...................... G06T 3/4092 709/217 |
| 2008/0235573 A1* | 9/2008 | Serdy | ................ G06F 17/30905 715/239 |

(Continued)

OTHER PUBLICATIONS

United States Office Action, U.S. Appl. No. 13/677,059, dated Mar. 24, 2016, 19 pages.

(Continued)

*Primary Examiner* — Shean Tokuta
*Assistant Examiner* — Juan C Turriate Gastulo
(74) *Attorney, Agent, or Firm* — Fenwick & West LLP

(57) ABSTRACT

Techniques for substituting references to content shared within the social networking system. In an embodiment, a first reference to a first version of content is received. A second version of the content is selected based on at least one optimization objective. A second reference to the second version of the content is created for provision to a user of a social networking system. The second reference is provided for the user. The at least one optimization objective includes at least one of a business objective, a technical objective, and a legal objective. The content may include at least one of video and audio.

20 Claims, 9 Drawing Sheets

(52) U.S. Cl.
CPC ............. *H04N 21/00* (2013.01); *H04L 67/02* (2013.01); *H04L 67/2804* (2013.01); *H04L 67/2814* (2013.01)

(58) Field of Classification Search
CPC ....... H04L 67/18; H04L 67/327; H04L 67/02; H04L 67/10; H04L 51/32
See application file for complete search history.

(56) References Cited

U.S. PATENT DOCUMENTS

| | | | | |
|---|---|---|---|---|
| 2009/0313546 | A1* | 12/2009 | Katpelly | H04N 7/17318 715/723 |
| 2010/0318672 | A1* | 12/2010 | Bouazizi | H04L 67/2823 709/231 |
| 2011/0066710 | A1 | 3/2011 | Paul | |
| 2012/0303818 | A1* | 11/2012 | Thibeault | G06F 9/5072 709/226 |
| 2013/0047065 | A1* | 2/2013 | Lee | G06F 3/04842 715/229 |
| 2013/0051772 | A1* | 2/2013 | Ramaswamy | H04N 21/25875 386/291 |
| 2013/0110234 | A1 | 5/2013 | DeVita et al. | |
| 2013/0166391 | A1* | 6/2013 | Blow | H04L 67/06 705/14.66 |
| 2013/0268962 | A1 | 10/2013 | Snider et al. | |
| 2013/0343598 | A1* | 12/2013 | Kocks | H04N 21/8405 382/100 |
| 2014/0026160 | A1* | 1/2014 | Shrum, Jr. | H04N 21/25841 725/25 |
| 2014/0047413 | A1* | 2/2014 | Sheive | H04L 65/403 717/110 |

OTHER PUBLICATIONS

United States Office Action, U.S. Appl. No. 13/677,059, dated Sep. 8, 2015, 17 pages.
United States Office Action, U.S. Appl. No. 13/677,059, dated Jan. 29, 2015, 15 pages.

* cited by examiner

SYSTEMS AND METHODS FOR SUBSTITUTING REFERENCES TO CONTENT

CROSS REFERENCE TO RELATED APPLICATIONS

This application is a continuation of and claims the benefit of U.S. application Ser. No. 15/289,678, entitled "Systems and Methods for Substituting References to Content," filed Oct. 10, 2016, which is a continuation of and claims the benefit of U.S. application Ser. No. 13/677,059, entitled "Systems and Methods for Substituting References to Content," filed Nov. 14, 2012, now U.S. Pat. No. 9,503,509, each of which is incorporated by reference in its entirety.

FIELD OF THE INVENTION

The present invention relates to the field of social networking. More particularly, the present invention provides techniques for substituting links to videos shared within a social networking system.

BACKGROUND

Internet social networks have become a significant phenomenon. Social networks allow an Internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Information on a user's profile is often only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as videos. Users may upload videos to social networks and post links to videos hosted by third party sites. Users may discover new videos and share videos posted on their friends' profiles. Because of their collaborative nature, social networks have now become a popular means by which many people share videos and other media content.

SUMMARY

To allow for realization of optimization objectives of a social networking system, embodiments of the invention include systems, methods, and computer readable media to substitute references to content shared within the social networking system. A first reference to a first version of content is received. A second version of the content is selected based on at least one optimization objective. A second reference to the second version of the content is created for provision to a user of a social networking system.

In an embodiment, the content includes at least one of video and audio. In an embodiment, the second reference is provided for the user. In an embodiment, the at least one optimization objective includes at least one of a business objective, a technical objective, and a legal objective. In an embodiment, the at least one optimization objective includes a quality threshold.

In an embodiment, a request to access the content is received from the user. In an embodiment, capabilities of a computing device of the user to access at least one of the first version of the content and the second version of the content are determined. In an embodiment, the selecting is based on the determining capabilities of the computing device. In an embodiment, a location of the user is determined. It is determined that the user has no rights to access the first version of the content in the location.

In an embodiment, the first version of the content is provided by a first content sharing system. In an embodiment, the first content sharing system is not integrated with a platform of the social networking system. In an embodiment, the second version of the content is provided by the social networking system. In an embodiment, the second version of the content is provided by a second content sharing system separate from the first content sharing system. In an embodiment, the second content sharing system is integrated with a platform of the social networking system.

In an embodiment, metadata is associated with the second version of the content for presentation to the user. In an embodiment, at least one of the first reference and the second reference includes a URL. In an embodiment, it is determined whether to provide an attribution for the second version of the content for presentation to the user. In an embodiment, it is determined that the second version of the content satisfies a similarity threshold with the first version of the content.

Many other features and embodiments of the invention will be apparent from the accompanying drawings and from the following detailed description.

Figure 1A:
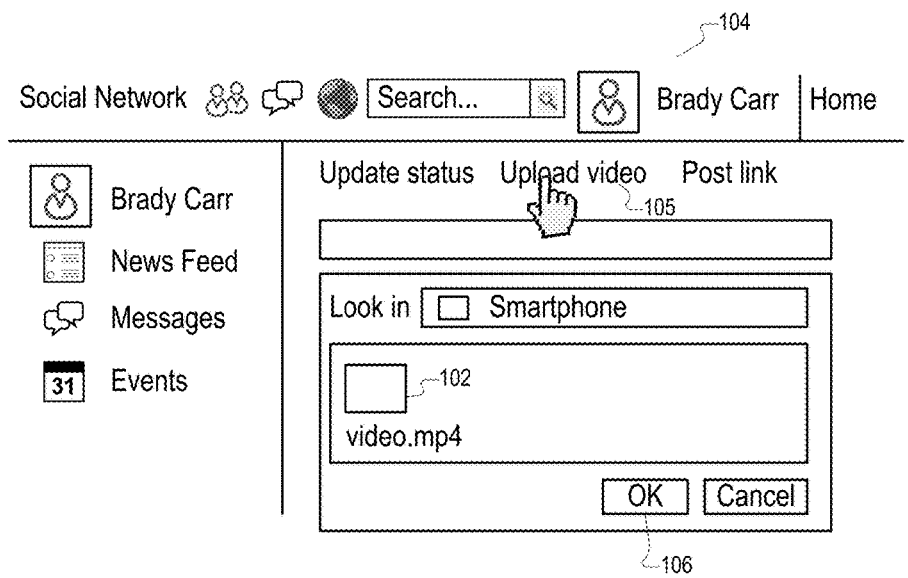
FIG. 1A illustrates a user interface of a social networking system including functionality for uploading a video to the social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Substituting References to Content

Users may take advantage of the collaborative features and functionality of a social networking system to upload and share digital videos. A user of the social networking system may share a video with other users of the social networking system. The video may be hosted or stored by a content provider. The content provider may be the social networking system, a third party content sharing system (or video source), or any other type of entity that may provide content. A third party content sharing system may be a site that is not controlled by the social networking system.

A user may share a video in a variety of manners. A user may share the video by posting a link to the video on her own wall, profile, or timeline, or on the wall, profile, or timeline of another user. A user may share a video by posting the video to a page associated with a group of users within the social networking system. A user may share a video by sending a link to the video in a message to another user of the social networking system. A user may select a "share" option associated with a video to post the video to a third party site. A user may select a "share" option associated with a video appearing on a third party site that is integrated within a platform operated by the social networking system to share the video on a page within the social networking system. In this regard, the social networking system may use iframes to allow third party sites to create applications that are hosted separately from the social networking system but operate within a session of the social networking system and are accessed through a user's profile. A user may select a "share" option associated with a video, which appears on a third party site to which the user authenticates using the credentials of her account on the social networking system, to share the video on a page within the social networking system. A video shared by a user may appear in the news feeds of other users, such as friends of the user who shared the video. A user may also share a video that has been first posted by one or more of the user's friends. Videos may be embedded within content delivered to a user by the social networking system such that the user may watch the video within a user interface of the social networking system without having to access a user interface of a third party content sharing system or a dedicated video viewing page.

Figure 1B:
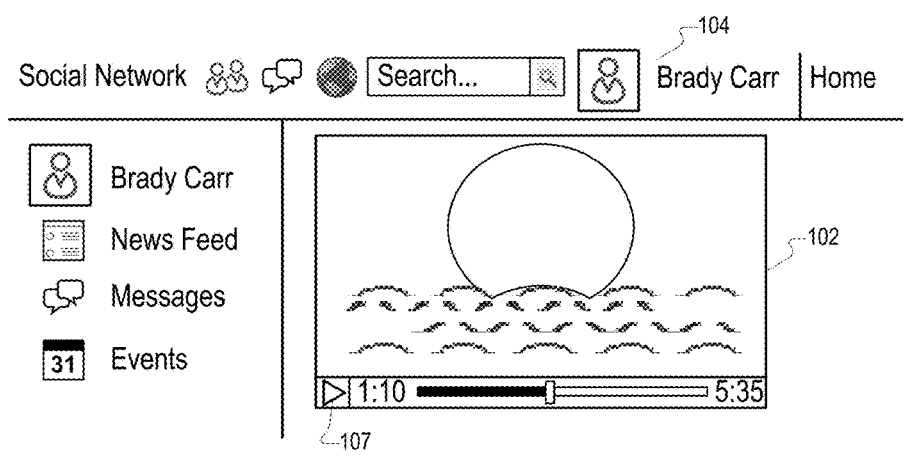
FIG. 1B illustrates the video within the user interface after it has been uploaded to the social networking system in accordance with an embodiment of the invention.

FIGS. 1A-1D illustrate example online video functionality of the social networking system in accordance with an embodiment of the invention. FIG. 1A illustrates a user interface 104 of the social networking system including functionality for uploading a video to the social networking system in accordance with an embodiment of the invention. An "upload" option 105 within the user interface 104 may be selected that prompts a user Brady Carr to browse to the location of the video 102 on a user device. The user device may be a smartphone, a desktop computer, a laptop computer, a tablet, or any type of computing device from which the social networking system may be accessed. An "OK" option 106 may be selected when the video 102 is located. FIG. 1B illustrates the video 102 within the user interface 104 after it has been uploaded to the social networking system in accordance with an embodiment of the invention. Playback of the video may be initiated, paused, and resumed using a playback button 107.

Figure 1C:
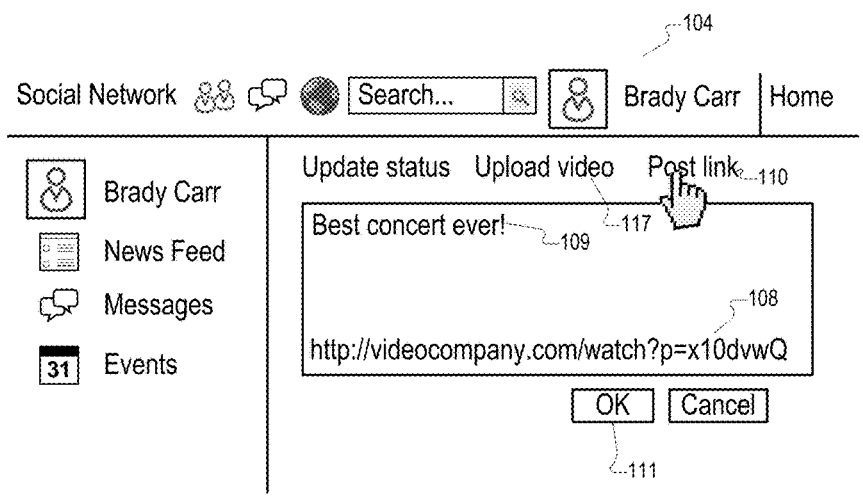
FIG. 1C illustrates the user interface of the social networking system including functionality for sharing a video, or a link thereto, in accordance with an embodiment of the invention.

FIG. 1C illustrates the user interface 104 of the social networking system including functionality for sharing a video, or a link thereto, in accordance with an embodiment of the invention. An option 110 to post a link to a video may be selected by the user Brady Carr. Text including a uniform resource locator (URL), such as a URL 108 accompanied by a message 109 composed by the user Brady Carr, may be entered by the user into the interface 104 and posted by selecting an "OK" option 111. In an embodiment, in lieu of entering the URL to share the video, the user may select an option to share the video from within a user interface of the third party content sharing system or from within the user's news feed within the social networking system. The URL 108 may point to a video provided by the social networking system or a third party content sharing system.

In an embodiment, upon receiving the URL 108, the social networking system may communicate with the third party content sharing system and retrieve metadata of the video. In an embodiment, the metadata may be retrieved through link scraping, i.e., extracting information from a resource associated with the video by, for example, parsing text embedded within or associated with the resource. As discussed below, the metadata may include the title of the video, a description of the video, the runtime length of the video, thumbnail images, still frames from the video, or any other information pertaining to the video. In an embodiment, an option 117 to upload a video may be selected by the user. The user may be prompted to specify a location of a video on his user device, select a video to upload, upload the video, and share the uploaded video. The social networking system may extract metadata from the uploaded video. The metadata may be used to compare two videos and determine whether they include similar content, as explained in further detail below. The metadata may also be displayed with the video when it, or a related link to the video, is shared on a page within the social networking system.

Figure 1D:
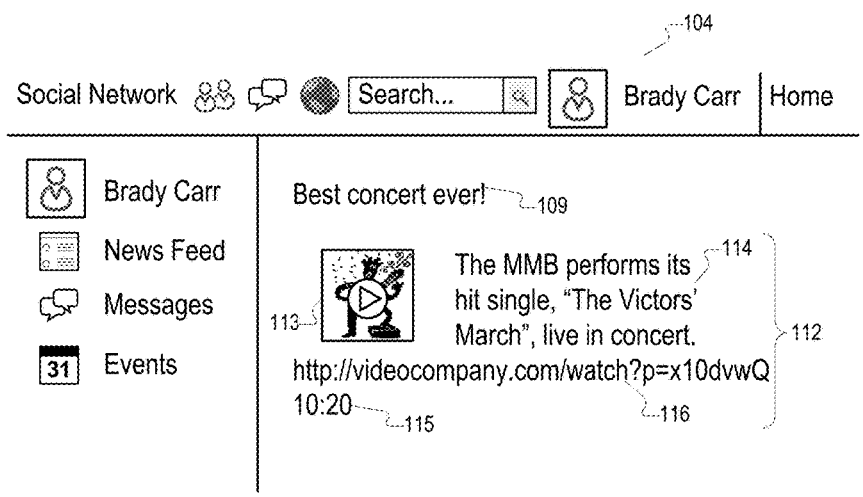
FIG. 1D illustrates a preview of the video corresponding to the link in accordance with an embodiment of the invention.

FIG. 1D illustrates a preview 112 of the video corresponding to the URL 108 in accordance with an embodiment of the invention. The preview 112 may be created by the social networking system using the metadata of the video retrieved from the third party content sharing system. The preview 112 includes a thumbnail image 113 of the video, a short description of the video 114, a video length indicator 115, and a video URL indicator 116 that points to the video. In an embodiment, the preview 112 may be published as a story in news feeds of other users of the social networking system, such as friends of the user Brady Carr. In an embodiment, when the preview 112 is published to the news feeds of other users of the social networking system, the preview 112 may include a "share" option (not pictured) for other users to share the video on their own profiles without having to type the URL. A user may play the video within or outside the interface 104 by selecting the thumbnail image 113.

Multiple versions of a video or other types of content may be uploaded to the social networking system or to several third party content sharing systems. The multiple versions may include multiple copies of the same video file. For example, a single video file may have been uploaded to a content sharing system multiple times, or to multiple content sharing systems. The multiple versions also may include multiple recordings of the same content. For example, different video recordings of the same content may have been uploaded to one or more content sharing systems. The versions may include different digitized copies of the same content. As an illustration, different recordings may have been made of the same television program. The different recordings may have been digitized and uploaded to a content sharing system. Further, the different recordings may have been digitized and uploaded to more than one content sharing system. Multiple versions of a video may include any versions that are identical or nearly identical to one another.

A user may share a video within the social networking system. In some instances, it may be desirable for the social networking system to present to potential viewers of the video a different version of the video from the version of the video shared by the user. The social networking system may substitute an alternate version of the video for the version of the video shared by the user. In an embodiment, the social networking system may create a reference to the alternate version and provide the reference to the alternate version to the potential viewers instead of a reference to the version that was shared. While the embodiments discussed herein may reference video, the embodiments may apply equally to audio, audio-visual, and other types of content.

According to an embodiment of the invention, the social networking system may identify an alternate or similar version of a video by applying any suitable conventional techniques for detecting similarities and differences in multimedia content. One such technique involves deriving the discrete cosine transform (DCT) of still frames within a video file. DCT values may be derived for one or more still frames in a first version of the video and one or more still frames in a second version of the video. The DCT values of the still frames in the first version may be compared with the DCT values of the still frames in the second version. Techniques such as deriving DCT values may be used in conjunction with other similarity detection techniques, such as comparing the runtime lengths, audio content, still frames, and thumbnail images of the first version and the second version to determine if the first version and the second version are versions of the same video. Still frames, runtime lengths, audio content, thumbnail images, and other information used to identify alternate or similar versions of a video may be included in the video metadata retrieved by the social networking system. The social networking system may identify the alternate version of the video with reference to a selected similarity threshold that denotes a defined degree of similarity between two videos.

The social networking system may determine that the version of the video shared by the user should be substituted with another version of the video based on one or more optimization objectives. The optimization objectives may be based on business, technical, legal, or other considerations, as discussed in further detail below. The social networking system may identify an alternate version of the video that conforms to the optimization objectives and substitute the alternate version for the shared version.

Figure 2:
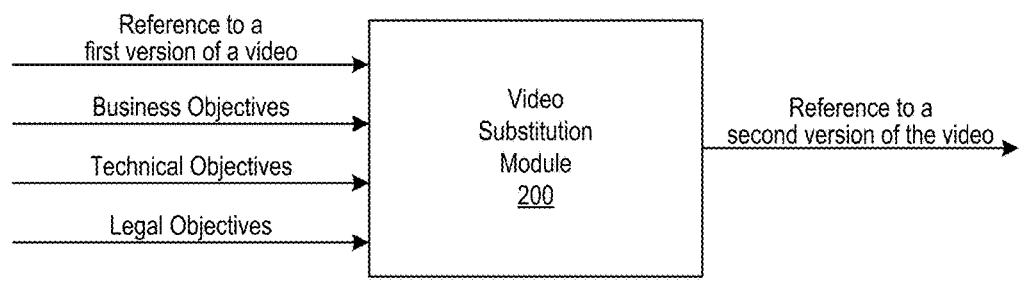
FIG. 2 illustrates an example video substitution module for substituting an alternate version of a video in accordance with an embodiment of the invention.

FIG. 2 illustrates an example video substitution module 200 for substituting an alternate version of a video in accordance with an embodiment of the invention. The social networking system may receive a reference to a first version of a video from a user. The first version of the video may be provided by the social networking system or a third party content sharing system. The video substitution module 200 may receive the reference to the first version of the video as an input. The video substitution module 200 may also receive as inputs optimization objectives that are determined or stored in one or more other modules of the social networking system. The optimization objectives may include business objectives, technical objectives, legal objectives, or other criteria. Based on the inputs, the video substitution module 200 may identify a second version of the video and substitute a reference to the second version of the video for the reference to the first version of the video. The second version of the video may be provided by the social networking system, a content sharing system that does not provide the first version of the video, or a content sharing system that does provide the first version of the video.

According to an embodiment of the invention, optimization objectives may include a desire to avoid linking to a particular third party content sharing system. The social networking system may have business objectives that may be not be served by linking to the particular third party content sharing system. For example, the social networking system may wish to direct traffic to the social networking system or another third party content sharing system deemed most advantageous for its users. The social networking system may prefer to direct traffic to a third party content sharing system that provides the user with the most relevant forms of advertising or provides the user with advertising from optimal sources. As another example, the social networking system may prefer to direct traffic to a third party content sharing system with which the social networking system has a partnership or other business relationship. Providing a link to a third party content sharing system with whom the social networking system has no relationship may, for example, prevent the social networking system from maximizing opportunities to place advertising or other revenue-generating content that may be most relevant to its users. In an embodiment, upon receiving a reference to a version of a video provided by a particular third party content sharing system from a user, the social networking system may substitute a reference to an alternate version of the video provided by the social networking system or another suitable third party content sharing system.

According to an embodiment of the invention, optimization objectives may include a desire to link to particular third party content sharing systems. The social networking system may have business objectives that are served by directing traffic to the particular third party content sharing systems. The business objectives may reflect a desire to optimize revenue generated by the social networking system. The business objectives may reflect a desire to ensure consistency in the source and type of shared videos across all users or a subset of users of the social networking system. For example, a first user of the social networking system may share a first version of a video, and a second user may share the first version of the video after viewing it. However, a third user may view the first version of the video but share a different, second version of the video. The viewing and sharing of the video and its different versions by various users may represent a "share path" of the video. The social networking system may select a particular version of the video to substitute for another version based on the share path of the video. For example, the social networking system may decide to present the first version of the video to subsequent users because the majority of users in the share path viewed the first version. As another example, the social networking system may decide to present the first version of the video to subsequent users because the first version was the initial version in the share path. As yet another example, the social networking system may decide to present the second version of the video to subsequent users because it was the most recent version in the share path. The business objectives may reflect a desire to leverage optimal functionality and features of content sharing systems that most benefit the users of the social networking system and optimize their user experience. For example, the social networking system may wish to display videos with a multimedia player that displays time stamps of scenes of the videos. The social networking system accordingly may substitute a version of a video hosted by a content sharing system that provides such a multimedia player for versions of the video hosted by content sharing systems that provide other types of players.

According to an embodiment of the invention, optimization objectives may include a desire to link to third party content sharing systems that utilize or integrate with a platform operated by the social networking system. In an embodiment, the platform may be implemented as a set of APIs provided by the social networking system that third party content sharing systems may utilize. The platform may be an advertising network, a content sharing network, a data sharing network, or other cooperative arrangement or integration. For example, the content sharing system or an associated multimedia player may be integrated with a platform of the social networking system or its multimedia player so that user actions taken with respect to the content sharing system may be tracked and recorded by the social networking system. Tracked and recorded actions of a user may be, for example, published as stories within news feeds of other users of the social networking system.

The platform of the social networking system may provide pre-defined object types that allow content sharing systems to classify actions of users so that the actions may be tracked and maintained by the social networking system. The platform of the social networking system may also allow content sharing systems to define custom object types within parameters specified by the social networking system. For example, the content sharing system may utilize pre-defined and custom object types to enable users to post comments associated with a video that are published to relevant audiences of both the content sharing system and the social networking system. In an embodiment, upon receiving a reference to a version of a video provided by a third party content sharing system that does not utilize the platform, the social networking system may substitute a link to an alternate version of the video provided by the social networking system or provided by a third party content sharing system that does utilize the platform of the social networking system. Further, the social networking system may present a link to an alternate version of the video when the associated third party content sharing system utilizes certain pre-defined or custom object types of the platform that may be preferred by the social networking system.

According to an embodiment of the invention, optimization objectives may include ensuring that videos may be viewed on the various devices used to access the social networking system. For example, a version of a video shared by a first user may not be viewable on a user device of a second user. The user device of the second user may lack the computing capabilities or technical features necessary to play the version of the video shared by the first user. Or, the third party content sharing system that provides the version of the video shared by the first user may lack a video player interface that is compatible with the user device of the second user. As another example, the bandwidth of a communications link may render presentation of the video shared by the first user difficult or impossible. In an embodiment, when the second user attempts to access the video shared by the first user, the social networking system may substitute an alternate version of the video that may be viewed on the user device of the second user.

According to an embodiment of the invention, optimization objectives may include a desire to maximize the quality of the content displayed to users of the social networking system. The social networking system may prefer not to display a video that does not meet certain quality standards. A first version of a video shared by a user may be of poor or mediocre quality. For example, the first version of the video may be blurry or contain artifacts that impair the viewing experience. In an embodiment, when the social networking system receives a reference to the first version of the video, the social networking system analyzes the quality of the first version of the video. If the quality falls below a quality threshold (e.g., minimum quality threshold), the social networking system may identify a second version of the video whose quality meets or exceeds the quality threshold. The quality threshold may be a measure of the number of artifacts in a video, the stability of the image in the video, the level of image distortion in the video, the quality of the audio associated with the video, or any other measure of audio or video quality. To provide video of acceptable quality to its users, the social networking system may substitute a reference to the second version of the video for the reference to the first version of the video.

According to an embodiment of the invention, optimization objectives may include a desire to minimize latency in accessing content. The social networking system may receive a reference to a first version of a video provided by a third party content sharing system that has high latency. For example, the social networking system may maintain usage statistics on various content sharing systems and may know in advance which content sharing systems are prone to high latency and which content sharing systems are likely to provide low latency. The social networking system may determine that a content sharing system employs technology that causes high response times for users or streams videos relatively slowly. In an embodiment, when the social networking system receives a reference to the first version of the video and determines that the first version of the video is provided by a site with high latency, the social networking system may identify a second version of the video that is provided by the social networking system or a third party content sharing system that has low latency. To minimize latency, the social networking system may substitute a reference to the second version of the video for the reference to the first version of the video.

According to an embodiment of the invention, optimization objectives may include a desire to conform to preferences specified by a user. The social networking system may receive a reference to a first version of a video that does not conform to a preference of the user who provided the reference or a user who seeks to view the video. For example, a user who seeks to view the video may have specified a preference that limits the resolution of videos displayed on his device to 480×640. The user may not wish to view videos whose resolution exceeds 480×640. If the resolution of the first version of the video exceeds 480×640, then when the user seeks to view the video, the social networking system may identify a second version of the video whose resolution is 480×640 or less. As another example, a user may specify a preference to view videos from certain content sharing systems and not others. As yet another example, the user may specify a preference to view videos only from content sharing systems that do not embed or display advertising within or adjacent to videos. Accordingly, the social networking system may identify and provide versions of the video provided by the preferred content sharing systems. To conform to user preferences, the social networking system may substitute a reference to the second version of the video for the reference to the first version of the video.

According to an embodiment of the invention, optimization objectives may include ensuring that content in the video may be legally viewed. For example, a user may be accessing the video from a region in which a content provider of the video does not have a license to publish it. Access to the video may be restricted to users in regions where the content provider of the shared version of the video has a license to the content in the video. In an embodiment, when the user attempts to access the video from a region where the content provider does not have a license to the content in the video, the social networking system may substitute an alternate version of the video hosted by a content provider that does have a license to the content in the video in the region of the user. As another example, optimization objectives may include ensuring that a content sharing system that is to provide access to a video is permitted to publish the video in general, apart from regional restrictions in particular. In this regard, the social networking system may provide an alternate version of the video hosted by a content sharing system that is legally entitled to publish the video.

Figure 3:
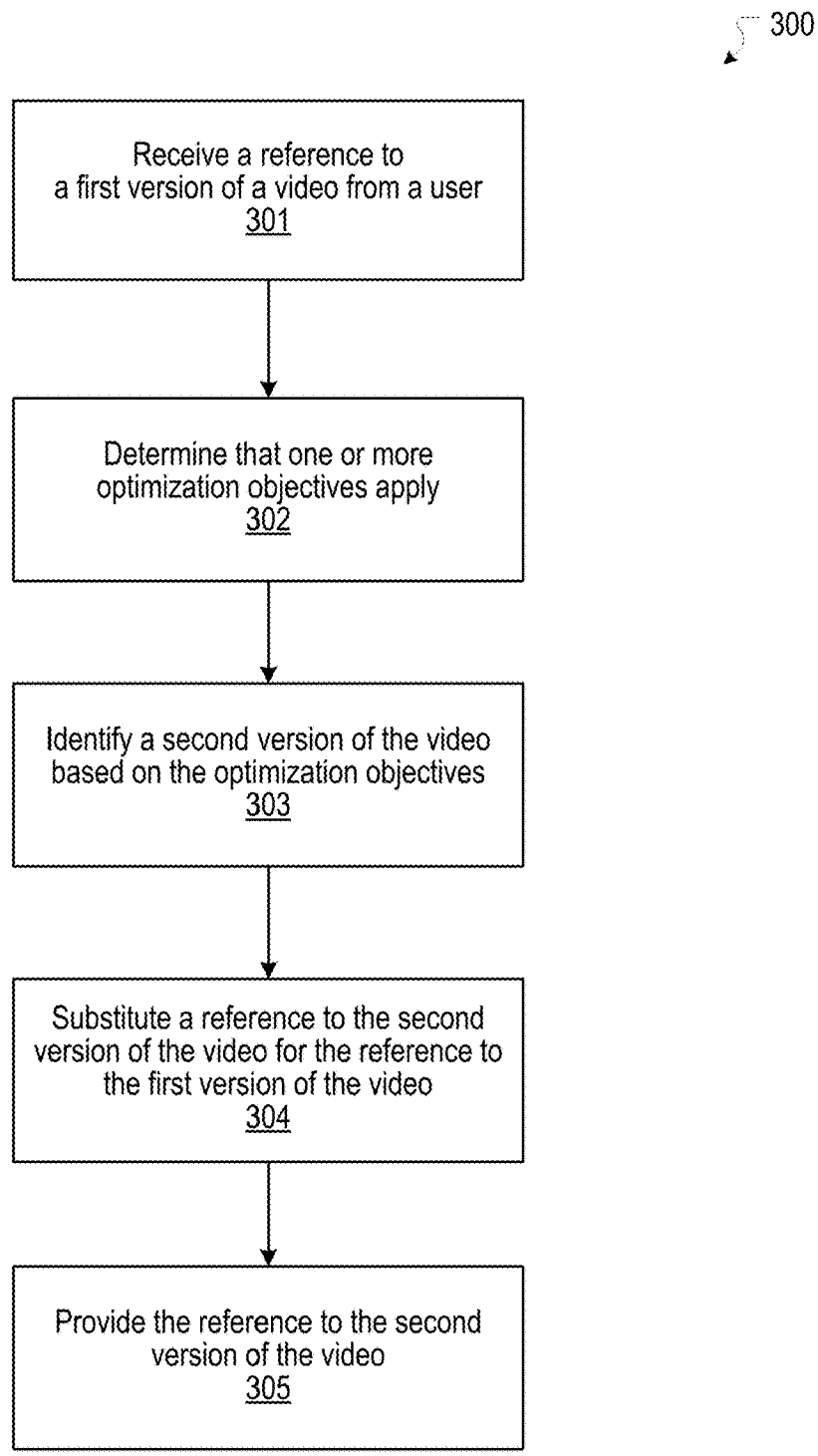
FIG. 3 illustrates a process for substituting a reference to a version of a video in accordance with an embodiment of the invention.

FIG. 3 illustrates a process 300 for substituting a reference to a version of a video in accordance with an embodiment of the invention. At block 301, the social networking system receives a reference to a first version of a video from a user. In an embodiment, the reference may comprise a URL. In an embodiment, the first version of the video may have been uploaded to the social networking system by the user. In an embodiment, the first version of the video may have been uploaded to a third party content sharing system. At block 302, the social networking system determines that one or more optimization objectives apply. The optimization objectives may include a business objective, a technical objective, or a legal objective of the social networking system, as discussed herein. In an embodiment, the social networking system may determine that the optimization objectives apply in response to receiving the reference to the video. For example, the social networking system may determine that the first version of the video may be provided by a content sharing system that is not optimal for the users of the social networking system or that is not integrated with a platform of the social networking system. As another example, the social networking system may determine that the first version of the video provided by the content sharing system is of insufficient quality. As yet another example, the social networking system may determine that the content sharing system associated with the first version of the video has no legal right to publish the video. In an embodiment, the social networking system may determine that the optimization objectives apply in response to determining the potential viewers of the video. For example, the social networking system may determine that a potential viewer of the video may have expressed a desire to see videos from a preferred content sharing system other than the content sharing system associated with the first version of the video. As another example, the social networking system may determine that the location of a potential viewer of the video is not consistent with a right of the content sharing system to provide the video in limited geographic regions. At block 303, the social networking system identifies a second version of the video based on the optimization objectives. The second version may be provided by the social networking system or a third party content sharing system. At block 304, the social networking system substitutes a reference to the second version of the video for the reference to the first version of the video. At block 305, the social networking system provides the reference to the second version of the video to potential viewers of the video. In an embodiment, the process 300 may be performed in whole or in part by the video substitution module 200 or any other module of the social networking system.

Figure 4:
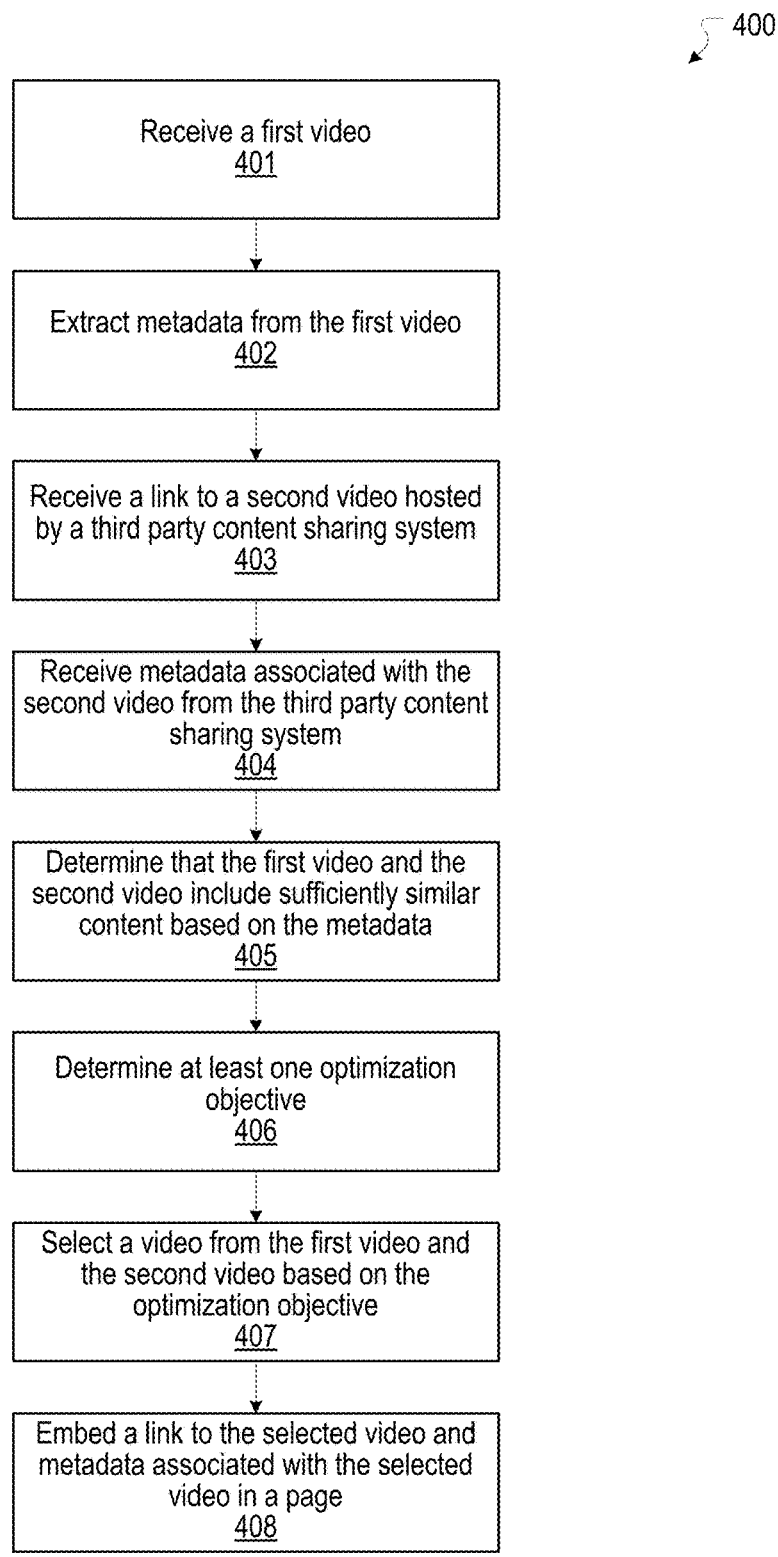
FIG. 4 illustrates a process for selecting a video to embed in a page provided to a user of the social networking system in accordance with an embodiment of the invention.

FIG. 4 illustrates a process 400 for selecting a video and embedding a link to the video in a page provided to a user of the social networking system in accordance with an embodiment of the invention. In the illustrated embodiment, the social networking system may receive a video uploaded to the social networking system by a user and a reference (e.g., a link) to a video hosted by a third party content sharing system. The social networking system may determine that the two videos include sufficiently similar content and determine that one should be substituted for the other based on one or more optimization objectives. At block 401, the social networking system receives a first video. The first video may be uploaded to the social networking system by a user. At block 402, the social networking system extracts metadata from the first video. The metadata may include a title, a description, thumbnail images, a runtime length, still frames, or any other type of information pertaining to the first video. At block 403, the social networking system receives a link to a second video hosted by a third party content sharing system. At block 404, the social networking system receives metadata associated with the second video from the third party content sharing system. The social networking system may receive the metadata by scraping the resource indicated by the link. As discussed above, the metadata may include a title, a description, thumbnail images, a runtime length, still frames, or any other type of information pertaining to the second video.

At block 405, the social networking system determines, based on the metadata associated with the first video and the metadata associated with the second video, that the first video and the second video include sufficiently similar content. In an embodiment, the social networking system may determine that the first video and the second video include sufficiently similar content based on techniques for detecting similarities in multimedia content using the metadata associated with the first video and the metadata associated with the second video. As discussed above, the techniques may include comparison of DCT values, thumbnail images, runtime lengths, or any other information in the first video and the second video, or their metadata. Any suitable video detection technique may be used to determine the similarity of videos. At block 406, the social networking system determines at least one optimization objective. The optimization objective may be a business objective, a technical objective, a legal objective, or other criteria such as the source (content sharing system), user experience, monetary value, video quality, player features, or other considerations, as discussed above. At block 407, the social networking system selects a video from among the first video and the second video based on the optimization objective. At block 408, the social networking system embeds a link to the selected video and metadata associated with the selected video in a page. The page may be a profile page, a news feed, a wall, a timeline, or any type of page to be provided to a user of the social networking system. In an embodiment, the process 400 may be performed in whole or in part by the video substitution module 200 or any other module of the social networking system.

The social networking system may not wish for a user who shares a video or a user who may view the video to know that an alternate version of the video has been substituted for the version of the video that was originally shared. If the video is displayed with an indication of a content provider that differs from the content provider of the version of the video that was shared, the user who shared the video may become aware that a substitution has occurred. According to an embodiment of the invention, the social networking system may display the video in a manner that omits any indication of the content provider of the video. In an embodiment, the social networking system may present the video in a playback interface that does not include any links, labels, logos, or other indications that may attribute the video to a particular content provider.

Figure 5:
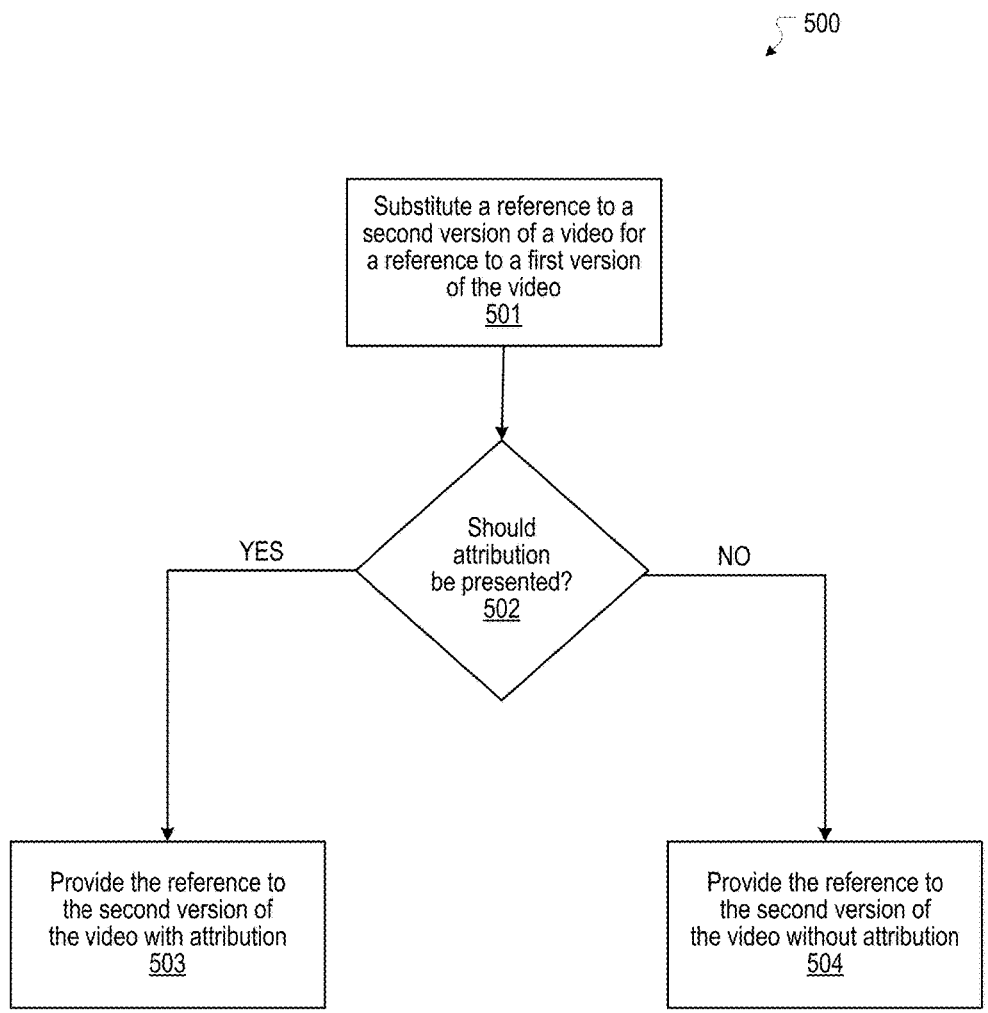
FIG. 5 illustrates a process for displaying a version of a video without attribution in accordance with an embodiment of the invention.

FIG. 5 illustrates a process 500 for displaying a version of a video without attribution in accordance with an embodiment of the invention. Initially, the social networking system may determine, based on one or more optimization objectives, that a reference to a second version of a video should be substituted for a reference to a first version of the video. At block 501, the social networking system substitutes the reference to the second version of the video for the reference to the first version of the video. At block 502, the social networking system determines whether attribution should be presented with the second version of the video. Attribution may comprise a link, a logo, a label, or any indication identifying a content provider of the video. If attribution should be presented, then at block 503, the social networking system provides the reference to the second version of the video with attribution. If attribution should not be presented, then at block 504, the social networking system provides the reference to the second version of the video without attribution. In an embodiment, the process 500 may be performed in whole or in part by the video substitution module 200 or any other module of the social networking system.

Figure 6A:
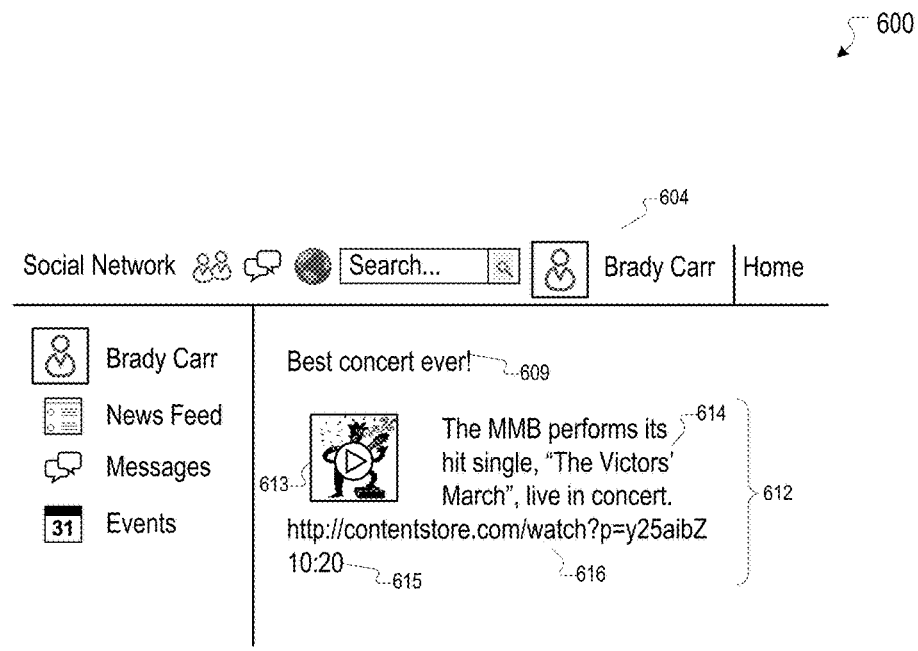
FIG. 6A illustrates a preview of the video with attribution to the content provider of an alternate version of the video in accordance with an embodiment of the invention.
Figure 6B:
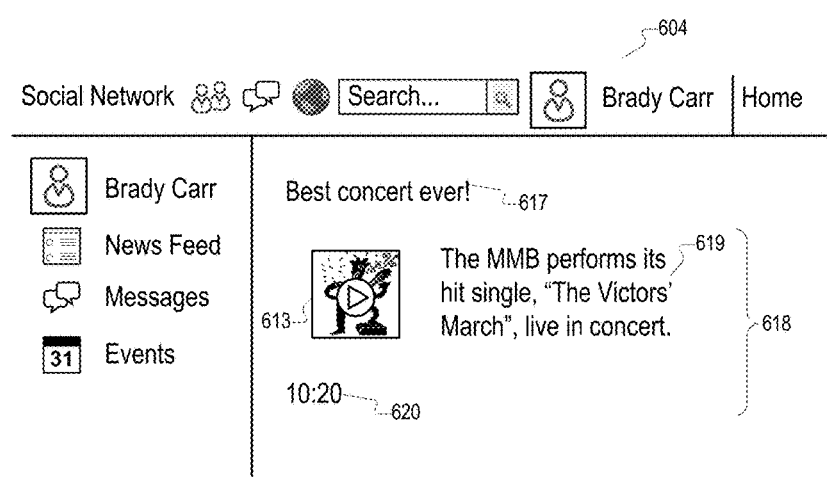
FIG. 6B illustrates a preview of the video with no attribution to the content provider of an alternate version of the video in accordance with an embodiment of the invention.

FIGS. 6A and 6B illustrate previews 612 and 618 of a video with and without attribution, respectively, within an interface 604 of the social networking system in accordance with an embodiment of the invention. The previews 612 and 618 of FIGS. 6A and 6B may be generated upon a user (e.g., "Brady Carr") sharing the URL 208, http://videocompany-.com/watch?p=x10dvwQ, in FIG. 2C. In FIG. 6A, the preview 612 includes a thumbnail image 613 of the video, a short description 614, a video length indicator 615, and a video link indicator 616, displayed alongside message text 609. The URL in the video link indicator 616, http://contentstore.com/watch?p=y25aibZ, is different from the URL 208, indicating to the user that the social networking system has substituted the shared version of the video for an alternate version of the video. In FIG. 6B, the preview 618 includes the thumbnail image 613 of the video, a short description 619, and a video length indicator 620, alongside message text 617. A video link indicator is absent from the preview 618, indicating that the social networking system has determined that attribution should not be presented with the video.

Social Networking System—Example Implementation

Figure 7:
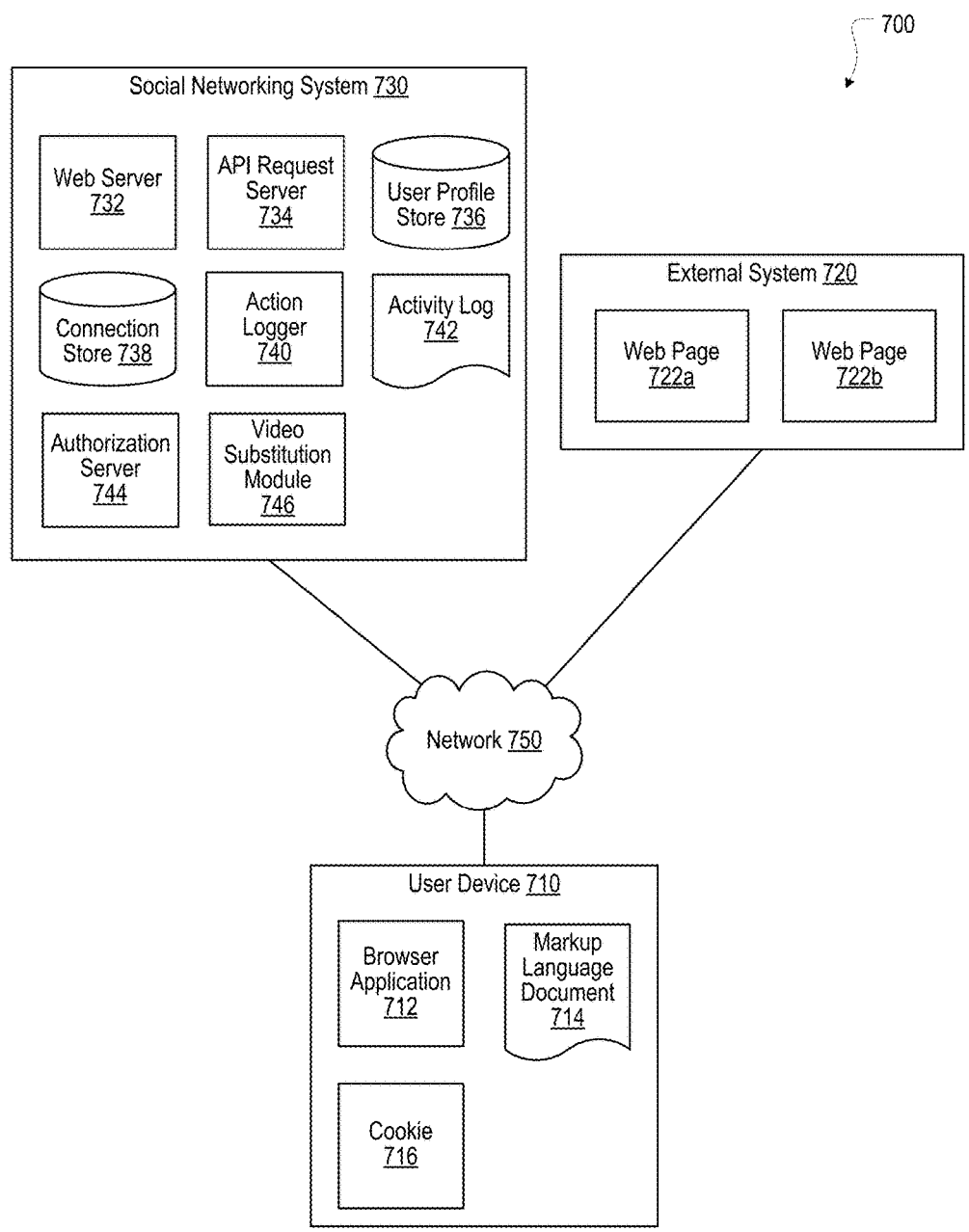
FIG. 7 illustrates a network diagram of a system for substituting video links within a social networking system in accordance with an embodiment of the invention.

FIG. 7 is a network diagram of a system 700 for substituting video links within a social network in accordance with an embodiment of the invention. The system 700 includes one or more user devices 710, one or more external systems 720, a social networking system 730, and a network 750. In an embodiment, the social networking system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744, and a video substitution module 746. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

According to an embodiment of the invention, the social networking system 730 may include the video substitution module 746. The video substitution module 746 may control the sharing of videos or other content within the social networking system 730. The video substitution module 746 may receive a reference to a version of a video provided by a user of the social networking system 730 and substitute for the reference another reference to an alternate version of the video. The substitution may be based on the application of optimization objectives of the social networking system 730 in accordance with embodiments described herein. In an embodiment, the video substitution module 746 may be implemented as the video substitution module 200 of FIG. 2.

Hardware Implementation

Figure 8:
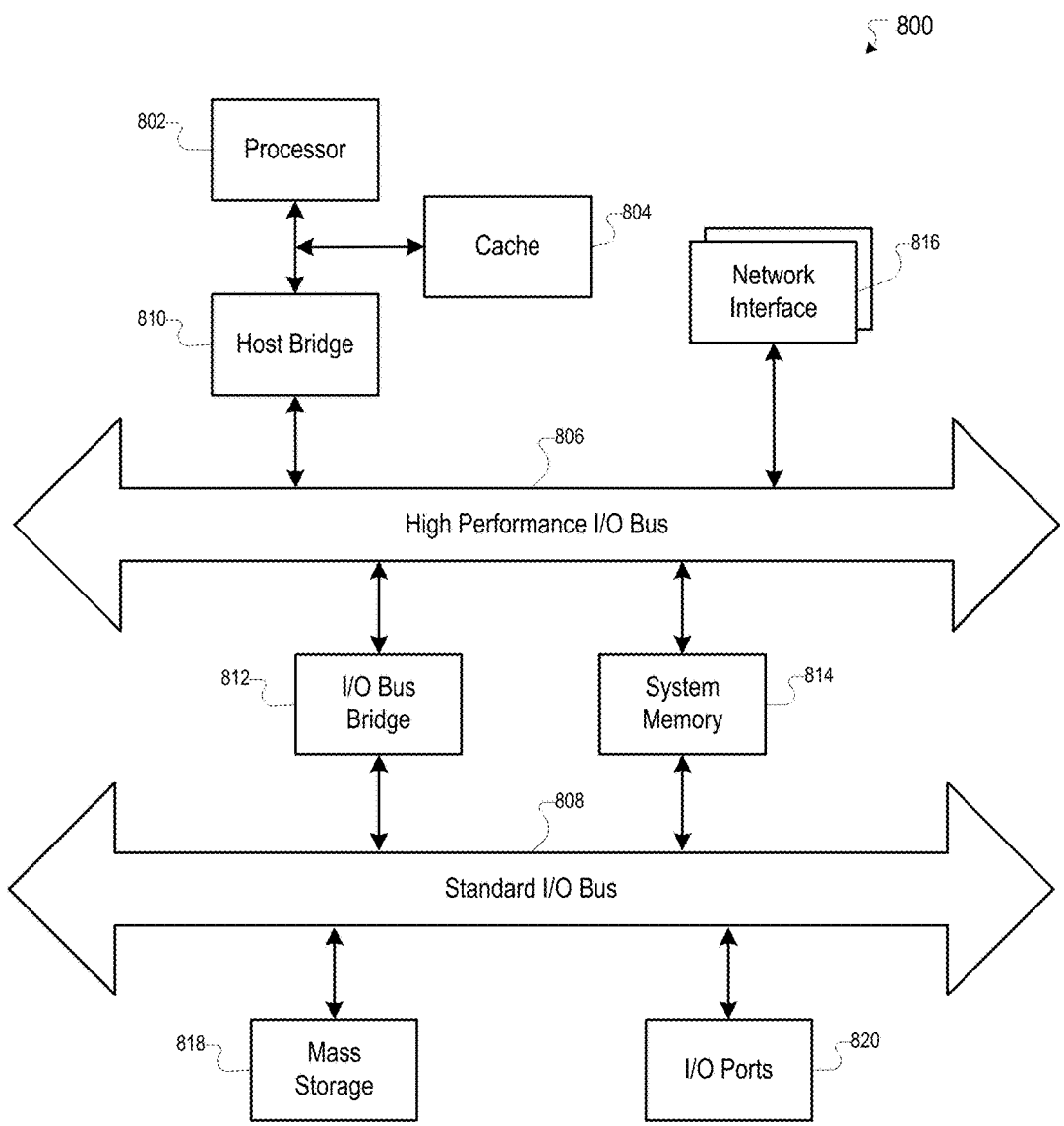
FIG. 8 illustrates an example of a computer system that may be used to implement one or more of the embodiments described herein in accordance with an embodiment of the invention.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 720, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving, by a social networking system from a user, a first reference to a first version of a content requested by a user to be shared with other users in the social networking system;
   selecting, by the social networking system, a second version of the content from a plurality of alternate versions based on at least one objective of the social networking system to meet a particular goal of the social networking system, the second version of the content being a different version of a same content as the first version of the content;
   creating, by the social networking system, a second reference to the second version of the content for the social networking system to substitute with the first reference; and
   providing for display, by the social networking system, the content from the user with the second reference to the second version of the content without the user or the other users being made aware that the second reference was substituted for the first reference.

2. The computer implemented method of claim 1, wherein the content includes at least one of video content and audio content.

3. The computer implemented method of claim 1, wherein the at least one objective includes at least one of a business objective, a technical objective, and a legal objective.

4. The computer implemented method of claim 1, wherein the at least one objective includes a technical objective, further comprising determining capabilities of at least one computing device of the other users to access the content.

5. The computer implemented method of claim 4, wherein the selecting is based on the determined capabilities of the at least one computing device.

6. The computer implemented method of claim 1, wherein the at least one objective includes a quality threshold, and wherein the second reference corresponds to a highest quality of the content to the each of the other users.

7. The computer implemented method of claim 1, wherein the second reference displays a highest quality of the content to the each of the other users.

8. The computer implemented method of claim 1, further comprising:
   determining a location of a viewing user of the other users; and
   determining that the viewing user has no rights to access the first version of the content in the location.

9. The computer implemented method of claim 1, wherein the second reference is configured to provide a minimum latency when being accessed by the each of the other users to access the content.

10. The computer implemented method of claim 1, wherein the first version of the content is provided by a first content sharing system.

11. The computer implemented method of claim 10, wherein the first content sharing system is not integrated with a platform of the social networking system.

12. The computer implemented method of claim 11, wherein the second version of the content is provided by the social networking system.

13. The computer implemented method of claim 11, wherein the alternate versions of the content is provided by at least one second content sharing system separate from the first content sharing system.

14. The computer implemented method of claim 13, wherein the at least one second content sharing system is integrated with a platform of the social networking system.

15. The computer implemented method of claim 1, further comprising associating metadata with the alternate versions of the content for presentation to the other users, wherein the metadata includes at least one of a title, a description, a thumbnail image, a runtime length, and a still frame.

16. The computer implemented method of claim 1, wherein at least one of the first reference and the second reference includes a Uniform Resource Locator (URL).

17. The computer implemented method of claim 1, further comprising determining whether to provide attribution for the alternate versions of the content for presentation to the user.

18. The computer implemented method of claim 1, further comprising determining a similarity measure between each of the alternate versions of and the first version of the content, wherein the similarity measures are within a similarity measure threshold.

19. A system comprising:
   at least one processor; and
   a memory storing instructions configured to instruct the at least one processor to perform:
      receiving, by a social networking system from a user, a first reference to a first version of a content requested by a user to be shared with other users in the social networking system;
      selecting, by the social networking system, a second version of the content from a plurality of alternate versions based on at least one objective of the social networking system to meet a particular goal of the social networking system, the second version of the content being a different version of a same content as the first version of the content;
      creating, by the social networking system, a second reference to the second version of the content for the social networking system to substitute with the first reference; and
      providing for display, by the social networking system, the content from the user with the second reference to the second version of the content without the user or the other users being made aware that the second reference was substituted for the first reference.

20. A non-transitory computer storage medium storing computer-executable instructions that, when executed, cause a computer system to perform a computer-implemented method comprising:
   receiving, by a social networking system from a user, a first reference to a first version of a content requested by a user to be shared with other users in the social networking system;
   selecting, by the social networking system, a second version of the content from a plurality of alternate versions based on at least one objective of the social networking system to meet a particular goal of the social networking system, the second version of the content being a different version of a same content as the first version of the content;
   creating, by the social networking system, a second reference to the second version of the content for the social networking system to substitute with the first reference; and
   providing for display, by the social networking system, the content from the user with the second reference to the second version of the content without the user or the other users being made aware that the second reference was substituted for the first reference.

* * * * *